US010445682B2

(12) United States Patent
Tibbs et al.

(10) Patent No.: US 10,445,682 B2
(45) Date of Patent: Oct. 15, 2019

(54) SYSTEMS AND METHODS FOR PARCEL DELIVERY TO ALTERNATE DELIVERY LOCATIONS

(71) Applicant: United Parcel Service of America, Inc., Atlanta, GA (US)

(72) Inventors: Andy Tibbs, Roswell, GA (US); John Slayton, Brookhaven, GA (US); Sumeet Shroff, Atlanta, GA (US); Chris Grubb, Dallas, GA (US); Linda Touch, Roswell, GA (US); Mark Estes, Sandy Springs, GA (US); Robbyn Usherwood, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 14/170,298

(22) Filed: Jan. 31, 2014

(65) Prior Publication Data
US 2014/0222711 A1 Aug. 7, 2014

Related U.S. Application Data

(60) Provisional application No. 61/759,800, filed on Feb. 1, 2013.

(51) Int. Cl.
G06Q 10/08 (2012.01)

(52) U.S. Cl.
CPC ....... G06Q 10/083 (2013.01); G06Q 10/0833 (2013.01)

(58) Field of Classification Search
CPC .................................................. G06Q 10/083
See application file for complete search history.

(56) References Cited

U.S. PATENT DOCUMENTS 3,712,468 A    1/1973  Wenner et al.
5,153,842 A   10/1992  Dlugos, Sr. et al.
(Continued)

FOREIGN PATENT DOCUMENTS

CA   2893502 A   4/2004
CA   2551885     8/2005
(Continued)

OTHER PUBLICATIONS

Chung, Kun-Jen, and Yung-Fu Huang. "Optimal replenishment policies for EOQ inventory model with limited storage capacity under permissible delay in payments." Opsearch 41.1 (2004): 16-34.*

(Continued)

Primary Examiner — Daniel Vetter
Assistant Examiner — Scott M Tungate
(74) Attorney, Agent, or Firm — Shook, Hardy & Bacon L.L.P.

(57) ABSTRACT

A system, in various embodiments, is configured to redirect undeliverable parcels to alternate delivery locations. The parcels may be undeliverable due to an unavailability of an intended recipient of the parcels to sign for the parcels or otherwise take delivery of the parcels at the delivery address. The system may be configured to determine a suitable alternate delivery location based at least in part on: one or more parcel recipient preferences, one or more parcel shipper preferences, a location of the delivery address, etc. The system may be further configured to notify the parcel recipient of a redirection of the parcel to the alternate delivery address.

20 Claims, 5 Drawing Sheets

(56) References Cited

U.S. PATENT DOCUMENTS

| | | |
|---|---|---|
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,668,543 A | 9/1997 | Jones |
| 5,726,435 A | 3/1998 | Hara et al. |
| 5,774,053 A | 6/1998 | Porter |
| 5,786,748 A | 7/1998 | Nikolic et al. |
| 5,831,220 A | 11/1998 | Ramsden et al. |
| 5,831,860 A | 11/1998 | Foladare et al. |
| 5,979,750 A | 11/1999 | Kindell |
| 6,010,064 A | 1/2000 | Umeda et al. |
| 6,026,375 A | 2/2000 | Hall et al. |
| 6,028,517 A | 2/2000 | Sansone et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,323,782 B1 | 11/2001 | Stephens et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,433,732 B1 | 8/2002 | Dutta et al. |
| 6,442,589 B1 | 8/2002 | Takahashi et al. |
| 6,456,900 B1 | 9/2002 | Kakuta |
| 6,463,420 B1 | 10/2002 | Guidice et al. |
| 6,480,758 B2 | 11/2002 | Stevens |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,570,488 B2 | 5/2003 | Kucharczyk et al. |
| 6,595,342 B1 | 7/2003 | Maritzen et al. |
| 6,606,604 B1 | 8/2003 | Dutta |
| 6,612,489 B2 | 9/2003 | McCormick et al. |
| 6,615,092 B2 | 9/2003 | Bickley et al. |
| 6,618,668 B1 | 9/2003 | Laird |
| 6,634,551 B2 | 10/2003 | Barta et al. |
| 6,683,542 B1 | 1/2004 | Jones |
| 6,688,435 B1 | 2/2004 | Will et al. |
| 6,690,997 B2 | 2/2004 | Rivalto |
| 6,694,217 B2 | 2/2004 | Bloom |
| 6,700,507 B2 | 3/2004 | Jones |
| 6,701,299 B2 | 3/2004 | Kraisser et al. |
| 6,714,859 B2 | 3/2004 | Jones |
| 6,725,127 B2 | 4/2004 | Stevens |
| 6,741,927 B2 | 5/2004 | Jones |
| 6,748,295 B2 | 6/2004 | Tilles et al. |
| 6,748,318 B1 | 6/2004 | Jones |
| 6,748,320 B2 | 6/2004 | Jones |
| 6,756,879 B2 | 6/2004 | Shuster |
| 6,763,299 B2 | 7/2004 | Jones |
| 6,763,300 B2 | 7/2004 | Jones |
| 6,772,130 B1 | 8/2004 | Karbowski et al. |
| 6,791,450 B2 | 9/2004 | Gokcebay et al. |
| 6,804,606 B2 | 10/2004 | Jones |
| 6,820,805 B2 | 11/2004 | Stevens |
| 6,845,909 B2 | 1/2005 | Bong et al. |
| 6,859,722 B2 | 2/2005 | Jones |
| 6,862,576 B1 | 3/2005 | Turner et al. |
| 6,882,269 B2 | 4/2005 | Moreno |
| 6,902,109 B2 | 6/2005 | Barta et al. |
| 6,904,359 B2 | 6/2005 | Jones |
| 6,933,832 B1 | 8/2005 | Simms et al. |
| 6,950,803 B2 | 9/2005 | Tiley et al. |
| 6,952,645 B1 | 10/2005 | Jones |
| 6,961,711 B1 | 11/2005 | Chee |
| 6,967,575 B1 | 11/2005 | Dohrmann et al. |
| 6,974,928 B2 | 12/2005 | Bloom |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,990,467 B1 | 1/2006 | Kwan |
| 6,994,253 B2 | 2/2006 | Miller et al. |
| 7,020,623 B1 | 3/2006 | Tiley et al. |
| 7,028,895 B2 | 4/2006 | Ashaari |
| 7,030,781 B2 | 4/2006 | Jones |
| 7,031,959 B2 | 4/2006 | Garner et al. |
| 7,055,741 B2 | 6/2006 | Bong et al. |
| 7,068,149 B2 | 6/2006 | Lee et al. |
| 7,075,451 B2 | 7/2006 | Yamada |
| 7,110,958 B2 | 9/2006 | Yang |
| 7,133,743 B2 | 11/2006 | Tilles et al. |
| 7,158,941 B1 | 1/2007 | Thompson |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,254,549 B1 | 8/2007 | Bansal et al. |
| 7,257,552 B1 | 8/2007 | Franco |
| 7,267,920 B2 | 9/2007 | Nakazawa et al. |
| 7,312,702 B1 | 12/2007 | Willms et al. |
| 7,337,944 B2 | 3/2008 | Devar |
| 7,341,186 B2 | 3/2008 | Mrozik et al. |
| 7,358,857 B1 | 4/2008 | White |
| 7,376,598 B2 | 5/2008 | Estes et al. |
| 7,385,499 B2 | 6/2008 | Horton et al. |
| 7,422,149 B2 | 9/2008 | Aptekar |
| 7,426,484 B2 | 9/2008 | Joyce et al. |
| 7,479,899 B2 | 1/2009 | Horstemeyer |
| 7,501,946 B2 | 3/2009 | Lanigan et al. |
| 7,509,228 B2 | 3/2009 | Bielefeld et al. |
| 7,511,617 B2 | 3/2009 | Burman et al. |
| 7,528,722 B2 | 5/2009 | Nelson |
| 7,574,366 B2 | 8/2009 | Burman et al. |
| 7,580,845 B2 | 8/2009 | Burman et al. |
| 7,617,133 B1 | 11/2009 | Antony et al. |
| 7,624,024 B2 | 11/2009 | Levis et al. |
| 7,636,696 B1 | 12/2009 | Sigler, Jr. et al. |
| 7,647,231 B2 | 1/2010 | Kuebert et al. |
| 7,653,457 B2 | 1/2010 | Bloom |
| 7,653,603 B1 | 1/2010 | Holtkamp, Jr. et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,815,112 B2 | 10/2010 | Volpe et al. |
| 7,822,618 B2 | 10/2010 | Kaneko |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins et al. |
| 7,925,524 B2 | 4/2011 | Florence |
| 7,962,422 B1* | 6/2011 | Melechko et al. ............ 705/338 |
| 7,969,306 B2 | 6/2011 | Ebert et al. |
| 7,984,289 B2 | 7/2011 | Orbke et al. |
| 7,996,328 B1 | 8/2011 | Lundberg et al. |

(56) References Cited

U.S. PATENT DOCUMENTS

| | | |
|---|---|---|
| 8,010,430 B1 | 8/2011 | Chase et al. |
| 8,010,462 B2 | 8/2011 | Kinory et al. |
| 8,015,023 B1 | 9/2011 | Lee et al. |
| 8,027,933 B2 | 9/2011 | Lou et al. |
| 8,036,993 B2 | 10/2011 | Estes |
| 8,073,723 B1 | 12/2011 | Bilibin et al. |
| 8,086,546 B2 | 12/2011 | Spiegel et al. |
| 8,103,521 B2 | 1/2012 | Kuebert et al. |
| 8,103,716 B2 | 1/2012 | Boyce et al. |
| 8,108,265 B2 | 1/2012 | Bonner et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,156,007 B1 | 4/2012 | Anthony et al. |
| 8,204,799 B1 | 6/2012 | Murray et al. |
| 8,219,490 B2 | 7/2012 | Hammad et al. |
| 8,225,388 B2 | 7/2012 | Vogel et al. |
| 8,234,275 B2 | 7/2012 | Grant et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,280,824 B1 | 10/2012 | Vermeulen et al. |
| 8,291,234 B2 | 10/2012 | Snapp et al. |
| 8,306,923 B1 | 11/2012 | Roache et al. |
| 8,311,895 B1 | 11/2012 | Murugan et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,392,262 B2 | 3/2013 | Mallick et al. |
| 8,437,742 B2 | 5/2013 | Garskof |
| 8,468,062 B1* | 6/2013 | Kamdar ............ G06Q 30/0605 705/26.2 |
| 8,489,520 B2 | 7/2013 | Kuebert et al. |
| 9,141,931 B2 | 9/2015 | Ackerman |
| 9,195,950 B2 | 11/2015 | Schenken |
| 9,692,738 B1 | 6/2017 | Wenneman et al. |
| 9,798,999 B2 | 10/2017 | Schenken |
| 9,916,557 B1 | 3/2018 | Gillen et al. |
| 9,984,351 B1 | 5/2018 | Antony et al. |
| 10,007,712 B1 | 6/2018 | Williams et al. |
| 2001/0040422 A1 | 11/2001 | Gramlich |
| 2001/0042001 A1 | 11/2001 | Goto et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Komacki |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0019777 A1 | 2/2002 | Schwab et al. |
| 2002/0029194 A1 | 3/2002 | Lewis et al. |
| 2002/0032612 A1 | 3/2002 | Williams et al. |
| 2002/0032613 A1 | 3/2002 | Buettgenbach et al. |
| 2002/0035515 A1 | 3/2002 | Moreno |
| 2002/0038266 A1 | 3/2002 | Tuttrup et al. |
| 2002/0040350 A1 | 4/2002 | Shinzaki |
| 2002/0046056 A1 | 4/2002 | Demarco et al. |
| 2002/0070882 A1 | 6/2002 | Jones |
| 2002/0073039 A1 | 6/2002 | Ogg et al. |
| 2002/0080030 A1 | 6/2002 | Inomata |
| 2002/0082770 A1 | 6/2002 | Jones |
| 2002/0087371 A1 | 7/2002 | Abendroth |
| 2002/0103653 A1 | 8/2002 | Huxter |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0128915 A1 | 9/2002 | Haseltine |
| 2002/0130065 A1 | 9/2002 | Bloom |
| 2002/0138173 A1* | 9/2002 | Barta et al. .................. 700/225 |
| 2002/0143670 A1 | 10/2002 | Cushing et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1* | 11/2002 | Kuebert et al. .................. 705/1 |
| 2002/0177922 A1 | 11/2002 | Bloom |
| 2002/0178016 A1 | 11/2002 | McLellan |
| 2002/0178074 A1 | 11/2002 | Bloom |
| 2002/0184497 A1 | 12/2002 | Gage et al. |
| 2003/0003936 A1 | 1/2003 | Tighe |
| 2003/0023963 A1 | 1/2003 | Birkholz et al. |
| 2003/0025590 A1 | 2/2003 | Gokcebay et al. |
| 2003/0037009 A1 | 2/2003 | Tobin et al. |
| 2003/0040931 A1 | 2/2003 | De Mol Van Otterloo et al. |
| 2003/0040980 A1 | 2/2003 | Nakajima et al. |
| 2003/0046173 A1 | 3/2003 | Benjier et al. |
| 2003/0093180 A1 | 5/2003 | Stevens |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0160097 A1 | 8/2003 | Steiner |
| 2003/0171996 A1 | 9/2003 | Chen et al. |
| 2003/0193414 A1 | 10/2003 | Jones |
| 2003/0195784 A1 | 10/2003 | Smith, Jr. |
| 2003/0225625 A1 | 12/2003 | Chew et al. |
| 2004/0015393 A1 | 1/2004 | Fong et al. |
| 2004/0030604 A1 | 2/2004 | Young |
| 2004/0039712 A1 | 2/2004 | Tartal et al. |
| 2004/0044582 A1 | 3/2004 | Chowdhary et al. |
| 2004/0073449 A1 | 4/2004 | Yang |
| 2004/0073499 A1 | 4/2004 | Martin et al. |
| 2004/0088225 A1 | 5/2004 | Foth et al. |
| 2004/0093312 A1 | 5/2004 | Cordery et al. |
| 2004/0117276 A1 | 6/2004 | Kettler, III |
| 2004/0117278 A1 | 6/2004 | Dutta et al. |
| 2004/0117326 A1 | 6/2004 | Amato |
| 2004/0133446 A1 | 7/2004 | Myrick et al. |
| 2004/0134690 A1 | 7/2004 | Norris et al. |
| 2004/0143518 A1 | 7/2004 | Siegel |
| 2004/0149822 A1 | 8/2004 | Stevens et al. |
| 2004/0149824 A1 | 8/2004 | Miller et al. |
| 2004/0153370 A1 | 8/2004 | Yang |
| 2004/0158351 A1 | 8/2004 | Rivalto |
| 2004/0172260 A1 | 9/2004 | Junger et al. |
| 2004/0181310 A1 | 9/2004 | Stashluk, Jr. et al. |
| 2004/0199284 A1 | 10/2004 | Hara |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215588 A1 | 10/2004 | Cornelius |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1* | 1/2005 | McLellan et al. ............ 705/400 |
| 2005/0006470 A1 | 1/2005 | Mrozik et al. |
| 2005/0027607 A1 | 2/2005 | Pearson |
| 2005/0038758 A1 | 2/2005 | Hilbush et al. |
| 2005/0060164 A1 | 3/2005 | Eli Berl Illion |
| 2005/0060228 A1 | 3/2005 | Woo |
| 2005/0061877 A1 | 3/2005 | Stevens |
| 2005/0068178 A1 | 3/2005 | Lee et al. |
| 2005/0071258 A1 | 3/2005 | Kumakawa |
| 2005/0075989 A1 | 4/2005 | Baisi et al. |
| 2005/0080635 A1 | 4/2005 | Groff et al. |
| 2005/0080638 A1 | 4/2005 | Maseruka |
| 2005/0104716 A1 | 5/2005 | Simms et al. |
| 2005/0116033 A1 | 6/2005 | Moore |
| 2005/0119786 A1 | 6/2005 | Kadaba |
| 2005/0120003 A1 | 6/2005 | Drury et al. |
| 2005/0131774 A1 | 6/2005 | Huxter |
| 2005/0137901 A1 | 6/2005 | Siegel |
| 2005/0138382 A1 | 6/2005 | Hougaard et al. |
| 2005/0149372 A1 | 7/2005 | Kite et al. |
| 2005/0216553 A1 | 9/2005 | Mallonee et al. |
| 2005/0218222 A1 | 10/2005 | Nark et al. |
| 2005/0234911 A1* | 10/2005 | Hess et al. .................. 707/9 |
| 2005/0251402 A1 | 11/2005 | Olsen, III et al. |
| 2006/0010037 A1 | 1/2006 | Angert et al. |
| 2006/0010077 A1 | 1/2006 | Dohrmann et al. |

(56) References Cited

U.S. PATENT DOCUMENTS

| | | |
|---|---|---|
| 2006/0020366 A1 | 1/2006 | Bloom |
| 2006/0020489 A1 | 1/2006 | Rivalto |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0149577 A1 | 7/2006 | Stashluk et al. |
| 2006/0224512 A1 | 10/2006 | Kurakata |
| 2006/0229895 A1 | 10/2006 | Kodger, Jr. |
| 2006/0235739 A1 | 10/2006 | Levis et al. |
| 2006/0238334 A1* | 10/2006 | Mangan ............... G06Q 10/08 340/539.13 |
| 2006/0282277 A1 | 12/2006 | Ng |
| 2006/0287870 A1 | 12/2006 | Mayer et al. |
| 2007/0005452 A1 | 1/2007 | Klingenberg et al. |
| 2007/0016538 A1 | 1/2007 | Bielefeld et al. |
| 2007/0036117 A1 | 2/2007 | Taube et al. |
| 2007/0047459 A1 | 3/2007 | Kadaba |
| 2007/0062851 A1 | 3/2007 | Schulz et al. |
| 2007/0078797 A1 | 4/2007 | Won et al. |
| 2007/0083410 A1 | 4/2007 | Hanna |
| 2007/0095904 A1 | 5/2007 | Barta et al. |
| 2007/0124295 A1 | 5/2007 | Forman et al. |
| 2007/0143281 A1 | 6/2007 | Smirin et al. |
| 2007/0150533 A1 | 6/2007 | Krause et al. |
| 2007/0156415 A1 | 7/2007 | Foth et al. |
| 2007/0185598 A1 | 8/2007 | Ortega |
| 2007/0192191 A1 | 8/2007 | Neal et al. |
| 2007/0198290 A1 | 8/2007 | Kinory et al. |
| 2007/0266081 A1 | 11/2007 | Murchison, III et al. |
| 2008/0004928 A1 | 1/2008 | Trellevik et al. |
| 2008/0004957 A1 | 1/2008 | Hildreth et al. |
| 2008/0004967 A1 | 1/2008 | Gillen |
| 2008/0004995 A1 | 1/2008 | Klingenberg et al. |
| 2008/0040246 A1 | 2/2008 | Fukamachi |
| 2008/0051995 A1 | 2/2008 | Lokshin et al. |
| 2008/0061966 A1 | 3/2008 | Nelson |
| 2008/0082346 A1 | 4/2008 | Hoopes et al. |
| 2008/0109246 A1 | 5/2008 | Russell |
| 2008/0121682 A1 | 5/2008 | Grim et al. |
| 2008/0133261 A1 | 6/2008 | Ray |
| 2008/0154781 A1 | 6/2008 | Kumar |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0249830 A1 | 10/2008 | Gilman et al. |
| 2008/0313018 A1 | 12/2008 | Kamm, IV et al. |
| 2008/0319970 A1 | 12/2008 | Garner et al. |
| 2008/0320092 A1 | 12/2008 | Campbell et al. |
| 2009/0001153 A1 | 1/2009 | Lim |
| 2009/0012802 A1 | 1/2009 | Pinney |
| 2009/0043552 A1 | 2/2009 | Tomlinson, Jr. et al. |
| 2009/0046892 A1 | 2/2009 | Avant et al. |
| 2009/0063215 A1 | 3/2009 | Heise et al. |
| 2009/0076888 A1 | 3/2009 | Oster et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0173672 A1 | 7/2009 | Avant et al. |
| 2009/0187489 A1 | 7/2009 | Mallick et al. |
| 2009/0240597 A1 | 9/2009 | Oswald |
| 2009/0259509 A1 | 10/2009 | Landvater |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2010/0004960 A1 | 1/2010 | Frankenberg et al. |
| 2010/0011238 A1 | 1/2010 | Nakamura et al. |
| 2010/0012769 A1 | 1/2010 | Alber et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0114678 A1 | 5/2010 | Axe et al. |
| 2010/0121689 A1 | 5/2010 | Wallace et al. |
| 2010/0138281 A1 | 6/2010 | Zhang et al. |
| 2010/0162149 A1 | 6/2010 | Sheleheda et al. |
| 2010/0185565 A1 | 7/2010 | Wade |
| 2010/0211444 A1 | 8/2010 | Spear |
| 2010/0223127 A1 | 9/2010 | Bettez et al. |
| 2010/0223134 A1 | 9/2010 | Lunenfeld |
| 2010/0235290 A1 | 9/2010 | Junger et al. |
| 2010/0250291 A1 | 9/2010 | Walker et al. |
| 2010/0280955 A1 | 11/2010 | Ross et al. |
| 2011/0004562 A1 | 1/2011 | Hennessy et al. |
| 2011/0084162 A1 | 4/2011 | Goossen et al. |
| 2011/0093361 A1 | 4/2011 | Morales |
| 2011/0125665 A1 | 5/2011 | Kadaba |
| 2011/0153513 A1 | 6/2011 | Erie et al. |
| 2011/0191697 A1* | 8/2011 | Sumner et al. ............... 715/758 |
| 2011/0246323 A1 | 10/2011 | Mehta et al. |
| 2011/0270714 A1 | 11/2011 | Myrick et al. |
| 2011/0287748 A1 | 11/2011 | Angel et al. |
| 2011/0288896 A1 | 11/2011 | Dewey, Jr. et al. |
| 2012/0016948 A1 | 1/2012 | Sinha |
| 2012/0030124 A1 | 2/2012 | Cronkright, II et al. |
| 2012/0030133 A1* | 2/2012 | Rademaker ............ G06Q 10/08 705/333 |
| 2012/0047084 A1 | 2/2012 | Naghshineh et al. |
| 2012/0047085 A1 | 2/2012 | Naghshineh et al. |
| 2012/0062362 A1 | 3/2012 | Rudduck et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0166320 A1 | 6/2012 | Junger |
| 2012/0179622 A1 | 7/2012 | Amato |
| 2012/0185363 A1 | 7/2012 | Gilbert |
| 2012/0235786 A1 | 9/2012 | Rudduck et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2012/0330774 A1 | 12/2012 | Sadot et al. |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0018894 A1 | 1/2013 | Qiao |
| 2013/0018999 A1 | 1/2013 | Merrill et al. |
| 2013/0024307 A1 | 1/2013 | Fuerstenberg et al. |
| 2013/0054054 A1 | 2/2013 | Tollenaere et al. |
| 2013/0061337 A1 | 3/2013 | Zimberoff et al. |
| 2013/0073336 A1 | 3/2013 | Heath |
| 2013/0073605 A1 | 3/2013 | Fosburgh et al. |
| 2013/0088323 A1 | 4/2013 | Ryan |
| 2013/0144428 A1 | 6/2013 | Irwin et al. |
| 2013/0151419 A1 | 6/2013 | Hitchcock et al. |
| 2013/0166067 A1 | 6/2013 | Irwin et al. |
| 2013/0202185 A1 | 8/2013 | Irwin, Jr. et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262311 A1 | 10/2013 | Buhrmann et al. |
| 2013/0262336 A1 | 10/2013 | Wan et al. |
| 2013/0268437 A1 | 10/2013 | Desai et al. |
| 2013/0338822 A1 | 12/2013 | Gibson, Jr. et al. |
| 2014/0034727 A1 | 2/2014 | Hancock et al. |
| 2014/0035721 A1 | 2/2014 | Heppe et al. |
| 2014/0052661 A1 | 2/2014 | Shakes et al. |
| 2014/0081677 A1 | 3/2014 | Craig et al. |
| 2014/0180959 A1 | 6/2014 | Gillen et al. |
| 2014/0236688 A1 | 8/2014 | Minter et al. |
| 2014/0258098 A1 | 9/2014 | Felix et al. |
| 2014/0278602 A1 | 9/2014 | Lievens et al. |
| 2014/0278603 A1 | 9/2014 | Lievens et al. |
| 2014/0278843 A1 | 9/2014 | Lievens et al. |
| 2014/0279648 A1 | 9/2014 | Whitehouse |

(56) References Cited

U.S. PATENT DOCUMENTS

| | | |
|---|---|---|
| 2014/0279650 A1 | 9/2014 | Lievens et al. |
| 2014/0279654 A1 | 9/2014 | Lievens et al. |
| 2014/0279658 A1 | 9/2014 | Lievens et al. |
| 2014/0279663 A1 | 9/2014 | Lievens et al. |
| 2014/0279664 A1 | 9/2014 | Lievens et al. |
| 2014/0279665 A1 | 9/2014 | Lievens et al. |
| 2014/0279666 A1 | 9/2014 | Lievens et al. |
| 2014/0279667 A1 | 9/2014 | Gillen |
| 2014/0330407 A1 | 11/2014 | Corder et al. |
| 2015/0058163 A1 | 2/2015 | Lenahan et al. |
| 2015/0088694 A1 | 3/2015 | Ackerman |
| 2015/0088731 A1 | 3/2015 | Ackerman |
| 2015/0106291 A1 | 4/2015 | Robinson et al. |
| 2015/0106292 A1 | 4/2015 | Robinson et al. |
| 2015/0106293 A1 | 4/2015 | Robinson et al. |
| 2015/0106294 A1 | 4/2015 | Robinson et al. |
| 2015/0106295 A1 | 4/2015 | Robinson et al. |
| 2015/0106296 A1 | 4/2015 | Robinson et al. |
| 2015/0120602 A1 | 4/2015 | Huffman et al. |
| 2015/0138382 A1 | 5/2015 | Xiao et al. |
| 2015/0193731 A1 | 7/2015 | Stevens et al. |
| 2015/0356801 A1 | 12/2015 | Nitu et al. |
| 2016/0140486 A1 | 5/2016 | Tibbs et al. |
| 2016/0140487 A1 | 5/2016 | Tibbs et al. |
| 2016/0189466 A1 | 6/2016 | Gibson et al. |
| 2017/0148059 A1 | 5/2017 | Minter et al. |
| 2017/0150304 A1 | 5/2017 | Baldasare et al. |
| 2017/0154483 A1 | 6/2017 | Cordiner et al. |
| 2017/0353943 A1 | 12/2017 | Skaaksrud |
| 2018/0060800 A1 | 3/2018 | Robinson |
| 2018/0060812 A1 | 3/2018 | Robinson et al. |
| 2018/0253688 A1 | 9/2018 | Schenken et al. |
| 2019/0172011 A1 | 6/2019 | Robinson et al. |

FOREIGN PATENT DOCUMENTS

| | | |
|---|---|---|
| CN | 1317758 A | 10/2001 |
| CN | 1432946 A | 7/2003 |
| CN | 1571975 A | 1/2005 |
| CN | 1666214 A | 9/2005 |
| CN | 1795461 A | 6/2006 |
| CN | 101203873 A | 6/2008 |
| CN | 101329752 A | 12/2008 |
| CN | 101491051 A | 7/2009 |
| CN | 101971201 A | 2/2011 |
| CN | 102609783 A | 7/2012 |
| CN | 102930655 A | 2/2013 |
| CN | 202720725 U | 2/2013 |
| EP | 1152356 A2 | 11/2001 |
| EP | 1365198 A1 | 11/2003 |
| EP | 2469291 A1 | 6/2012 |
| GB | 2528818 A | 2/2016 |
| JP | 62-121108 U | 7/1987 |
| JP | 5-211684 A | 8/1993 |
| JP | 10-207956 A | 8/1998 |
| JP | 11-139540 A | 5/1999 |
| JP | H11151154 A | 6/1999 |
| JP | 2000-339373 A | 12/2000 |
| JP | 2001-014393 A | 1/2001 |
| JP | 2001-022678 A | 1/2001 |
| JP | 2001-282974 A | 10/2001 |
| JP | 2001291027 A | 10/2001 |
| JP | 2001338030 A | 12/2001 |
| JP | 2002-042008 A | 2/2002 |
| JP | 2002-056307 A | 2/2002 |
| JP | 2002092505 A | 3/2002 |
| JP | 2002-109409 A | 4/2002 |
| JP | 2002157541 A | 5/2002 |
| JP | 2002259553 U | 9/2002 |
| JP | 2002288562 A | 10/2002 |
| JP | 2003196354 A | 7/2003 |
| JP | 2003263599 A | 9/2003 |
| JP | 2003321124 A | 11/2003 |
| JP | 2004-30159 A | 1/2004 |
| JP | 2004280468 A | 10/2004 |
| JP | 2004338824 A | 12/2004 |
| JP | 2005-043974 A | 2/2005 |
| JP | 2006-512635 A | 4/2006 |
| JP | 2006277199 A | 10/2006 |
| JP | 2007153618 A | 6/2007 |
| JP | 2008-542886 A | 11/2008 |
| JP | 2008303069 A | 12/2008 |
| JP | 2010128535 A1 | 6/2010 |
| JP | 2011118611 A | 6/2011 |
| JP | 2012-138000 A | 7/2012 |
| KR | 2001-0093768 A | 10/2001 |
| WO | 2011/074500 A1 | 4/2000 |
| WO | WO 00/19170 A1 | 4/2000 |
| WO | WO 00/19171 A1 | 4/2000 |
| WO | WO 00/30014 A1 | 5/2000 |
| WO | WO 00/46726 A2 | 8/2000 |
| WO | WO 00/46728 A2 | 8/2000 |
| WO | WO 00/52422 A1 | 9/2000 |
| WO | 01/08071 A1 | 2/2001 |
| WO | 0120423 A2 | 3/2001 |
| WO | WO 01/16889 A1 | 3/2001 |
| WO | WO 01/29778 A1 | 4/2001 |
| WO | WO 01/35344 A2 | 5/2001 |
| WO | WO 01/39031 A2 | 5/2001 |
| WO | WO 01/65451 A1 | 9/2001 |
| WO | WO 01/65454 A2 | 9/2001 |
| WO | WO 01/65523 A1 | 9/2001 |
| WO | WO 01/65524 A1 | 9/2001 |
| WO | WO 01/67344 A1 | 9/2001 |
| WO | WO 01/72109 A2 | 10/2001 |
| WO | WO 01/84359 A2 | 11/2001 |
| WO | WO 01/88831 A2 | 11/2001 |
| WO | WO 01/97101 A2 | 12/2001 |
| WO | WO 02/07104 A1 | 1/2002 |
| WO | WO 02/17045 A2 | 2/2002 |
| WO | WO 02/052378 A2 | 7/2002 |
| WO | 02073369 A2 | 9/2002 |
| WO | WO02073369 | 9/2002 |
| WO | 02080436 A2 | 10/2002 |
| WO | WO02080436 | 10/2002 |
| WO | WO03023688 | 3/2003 |
| WO | 03040979 A1 | 5/2003 |
| WO | WO 2004/015518 A2 | 2/2004 |
| WO | 2004042523 A2 | 5/2004 |
| WO | 2007055769 A2 | 5/2007 |
| WO | WO 2010/123611 A1 | 10/2010 |
| WO | WO 2012/129529 A1 | 9/2012 |
| WO | WO 2013/106940 A1 | 7/2013 |
| WO | 2014031691 A2 | 2/2014 |
| WO | WO14164853 | 10/2014 |
| WO | 2016/027178 A1 | 2/2016 |

OTHER PUBLICATIONS

SEP leads €26 million funding round for Kiala, http://www.sep.co.uk/news/story/sep-leads-e26-million-funding-round-for-kiala-2/, Nov. 30, 2007, SEP Scottish Equity Partners.

ASP V16-System Walker List Works Manual (relevant part); p. 88, line 5, 3.4 Start up and termination of ListWORKS writer; one page.

Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com/printthis/2001/0,4814,58696,00.html, Computer World.

Caminiti et al., United Parcel Service Introduces Advanced Label Imaging System, Published by Business Wire on Nov. 29, 1989, Section 1, p. 1, Downloaded from the Internet on Sep. 19, 2005, 2 pages.

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

Descartes, Scheduling Software Helps Webvan Meet 30-Minute Delivery Window, www.stores.org, Jul. 2000.

El Portal Del Transporte, FedEx Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <URL:http://www.transportando.net/newsabril_completa.htm>.

(56) References Cited

OTHER PUBLICATIONS

FedEx, "RPS Adds Automated Package Pick-Up to Redesigned Web Site," www.fedex.com/us/about/gound/pressreleases/pressrelease111198.html?link=4, retrieved Sep. 10, 2003.

Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.

iPventure, "Schedule Distribution Routes and Timeslots," http://www.ipventure.com/onlineorder/distribution.php, retrieved on Apr. 16, 2008.

Kihon Kara Jissen Made Business Seikou No Tameno Kanpeki Guide—How to E-Commerce (relevant part); p. 60; one page.

Many Happy Returns—UPS Unvels Advanced Outline Returns Solution, Journal, Sep. 20, 2000, Downloaded from the Internet on Oct. 3, 2002, Accession No. 12921102, Business Wire, United States of America.

Outlook 2000 Handbook First Edition (relevant part); p. 95, last 9 lines; one page.

Pender, Lee, Hard Times are the Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Van Huzien, Gordon, Messaging: The Transport Part of the XML Puzzle, Article, Jul. 2000 (Retrieved from the Internet Apr. 25, 2003: <URL:http://www-106.ibm.com/developerworks/library/xml-messaging/>.

Raco Industries, "Increase Delivery Visibility and Simplify Your Process," retrieved from <http://www.racointeractive.com/media/834/raco_interactive-pd.pdf>, on Sep. 25, 2013, 2 pages.

FedEx, "FedEx Mobile Ship", retrieved from <http://www.fedex.com/us/mobile/label.html, redirected to http://mobilesolutions.fedex.com/shipping-label.html > on Sep. 25, 2013, 2 pages.

Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.

Lindsay, Bruce R., "Congressional Research Service, Social Media and Disasters: Current Uses, Future Options, and Policy Considerations," CRS Report for Congress, Sep. 6, 2011, 10 pages, Congressional Research Service.

Related Case—U.S. Appl. No. 14/514,228, filed Oct. 14, 2014, entitled Systems and Methods for Establishing an Account of a User at a Locker Bank.

Related Case—U.S. Appl. No. 14/199,787, filed Mar. 6, 2014, entitled Systems and Methods of Delivering Parcels using Attended Delivery/Pickup Locations.

Related Case—U.S. Appl. No. 14/199,830, filed Mar. 6, 2014, entitled Systems and Methods of Suggesting Attended Delivery/Pickup Locations.

Related Case—U.S. Appl. No. 14/200,267, filed Mar. 7, 2014, entitled Systems and Methods of Reserving Space Attended Delivery/Pickup Locations.

Related Case—U.S. Appl. No. 14/200,301, filed Mar. 7, 2014, entitled Systems and Methods of Managing the Capacity of Attended Delivery/Pickup Locations.

Related Case—U.S. Appl. No. 14/200,432, filed Mar. 7, 2014, entitled Systems and Methods of Re-Routing Parcels Intended for Delivery to Attended Delivery/Pickup Locations.

Related Case—U.S. Appl. No. 14/200,328, filed Mar. 7, 2014, entitled Systems and Methods of Flexibly Activating Temporary Attended Delivery/Pickup Locations.

Related Case—U.S. Appl. No. 14/200,528, filed Mar. 7, 2014, entitled Systems and Methods of Managing Item Pickup at Attended Delivery/Pickup Locations.

Related Case—U.S. Appl. No. 14/200,681, filed Mar. 7, 2014, entitled Systems and Methods of Managing Signatures of Documents.

Related Case—U.S. Appl. No. 14/200,724, filed Mar. 7, 2014, entitled Systems and Methods for Returning Items to Attended Delivery/Pickup Locations.

Related Case—U.S. Appl. No. 14/201,029, filed Mar. 7, 2014, entitled Systems and Methods of Managing Item Pickup at Attended Delivery/Pickup Locations.

Related Case—U.S. Appl. No. 14/201,114, filed Mar. 7, 2014, entitled Systems and Methods of Locating and Selling Items at Attended Delivery/Pickup Locations.

Related Case—U.S. Appl. No. 14/201,241, filed Mar. 7, 2014, entitled Systems and Methods for Defining Attributes of Attended Delivery/Pickup Locations.

Related Case—U.S. Appl. No. 14/201,306, filed Mar. 7, 2014, entitled Systems and Methods for Determining Charges Related to the Delivery of a Parcel.

Related Case—U.S. Appl. No. 14/201,354, filed Mar. 7, 2014, entitled Systems and Methods for Ranking Potential Attended Delivery/Pickup Locations.

Related Case—U.S. Appl. No. 14/514,155, filed Oct. 14, 2014, entitled Systems and Methods for Facilitating Delivery of a Parcel to a Suitably Sized Locker.

Related Case—U.S. Appl. No. 14/514,000, filed Oct. 14, 2014, entitled Systems and Methods for Conveying a Parcel to a Consignee, for Example, After an Unsuccessful Delivery Attempt.

Related Case—U.S. Appl. No. 14/561,062, filed Dec. 4, 2014, entitled Systems and Methods for Conveying a Parcel to a Consignee, for Example, After an Unsuccessful Delivery Attempt.

Related Case—U.S. Appl. No. 14/514,276, filed Oct. 14, 2014, entitled Systems and Methods for Confirming an Identity of an Individual, for Example, at a Locker Bank.

Related Case—U.S. Appl. No. 14/561,041, filed Dec. 4, 2014, entitled Systems and Methods for Confirming an Identity of an Individual, for Example, at a Locker Bank.

Written Opinion of the International Searching Authority, dated Feb. 4, 2015, from corresponding International Application Serial No. PCT/US2014/060517.

PCT International Preliminary Report on Patentability, dated May 14, 2015, from corresponding International Application Serial No. PCT/US2014/014280.

PCT International Search Report, dated Nov. 17, 2014, from corresponding International Application Serial No. PCT/US2014/014280.

Written Opinion of the International Searching Authority, dated Nov. 17, 2014, from corresponding International Application Serial No. PCT/US2014/014280.

PCT International Search Report, dated Apr. 22, 2015, from corresponding International Application Serial No. PCT/US2014/023538.

Written Opinion of the International Searching Authority, dated Apr. 22, 2015, from corresponding International Application Serial No. PCT/US2014/023538.

Office Action, dated Jun. 24, 2015, from corresponding U.S. Appl. No. 14/199,830.

PCT International Search Report, dated Jun. 10, 2015, from corresponding International Application Serial No. PCT/US2014/023554.

Written Opinion of the International Searching Authority, dated Jun. 10, 2015, from corresponding International Application Serial No. PCT/US2014/023554.

Office Action, dated Jun. 17, 2015, from corresponding U.S. Appl. No. 14/200,301.

PCT International Preliminary Report on Patentability, dated Jun. 17, 2015, from corresponding International Application Serial No. PCT/US2014/023575.

(56) References Cited

OTHER PUBLICATIONS

PCT International Search Report, dated Nov. 25, 2014, from corresponding International Application Serial No. PCT/US2014/023575.
Written Opinion of the International Searching Authority, dated Nov. 25, 2014, from corresponding International Application Serial No. PCT/US2014/023575.
Office Action, dated May 6, 2015, from corresponding U.S. Appl. No. 14/200,432.
PCT International Preliminary Report on Patentability, dated May 8, 2015, from corresponding International Application Serial No. PCT/US2014/023583.
PCT International Search Report, dated Dec. 9, 2014, from corresponding International Application Serial No. PCT/US2014/023583.
Written Opinion of the International Searching Authority, dated Dec. 9, 2014, from corresponding International Application Serial No. PCT/US2014/023583.
PCT International Search Report, dated Jun. 9, 2015, from corresponding International Application Serial No. PCT/US2014/023597.
Written Opinion of the International Searching Authority, dated Jun. 9, 2015, from corresponding International Application Serial No. PCT/US2014/023597.
PCT International Search Report, dated Jan. 6, 2015, from corresponding International Application Serial No. PCT/US2014/023610.
Written Opinion of the International Searching Authority, dated Jan. 6, 2015, from corresponding International Application Serial No. PCT/US2014/023610.
PCT International Search Report, dated Dec. 8, 2014, from corresponding International Application Serial No. PCT/US2014/023629.
Written Opinion of the International Searching Authority, dated Dec. 8, 2014, from corresponding International Application Serial No. PCT/US2014/023629.
PCT International Preliminary Report on Patentability, dated May 22, 2015, from corresponding International Application Serial No. PCT/US2014/023629.
PCT International Search Report, dated Dec. 4, 2014, from corresponding International Application Serial No. PCT/US2014/023638.
Written Opinion of the International Searching Authority, dated Dec. 4, 2014, from corresponding International Application Serial No. PCT/US2014/023638.
PCT International Preliminary Report on Patentability, dated May 22, 2015, from corresponding International Application Serial No. PCT/US2014/023638.
PCT International Search Report, dated Jun. 15, 2015, from corresponding International Application Serial No. PCT/US2014/023643.
Written Opinion of the International Searching Authority, dated Jun. 15, 2015, from corresponding International Application Serial No. PCT/US2014/023643.
PCT International Preliminary Report on Patentability, dated Apr. 22, 2015, from corresponding International Application Serial No. PCT/US2014/023649.
PCT International Search Report, dated Dec. 22, 2014, from corresponding International Application Serial No. PCT/US2014/023649.
Written Opinion of the International Searching Authority, dated Dec. 22, 2014, from corresponding International Application Serial No. PCT/US2014/023649.
Office Action, dated Jan. 28, 2015, from corresponding U.S. Appl. No. 14/201,241.
PCT International Search Report, dated Dec. 31, 2014, from corresponding International Application Serial No. PCT/US2014/023658.

Written Opinion of the International Searching Authority, dated Dec. 31, 2014, from corresponding International Application Serial No. PCT/US2014/023658.
PCT International Preliminary Report on Patentability, dated Jun. 5, 2015, from corresponding International Application Serial No. PCT/US2014/023658.
PCT International Search Report, dated Nov. 25, 2014, from corresponding International Application Serial No. PCT/US2014/023665.
Written Opinion of the International Searching Authority, dated Nov. 25, 2014, from corresponding International Application Serial No. PCT/US2014/023665.
PCT International Preliminary Report on Patentability, dated Apr. 23, 2015, from corresponding International Application Serial No. PCT/US2014/023665.
Office Action, dated Apr. 24, 2015, from corresponding U.S. Appl. No. 14/201,354.
PCT International Search Report, dated Feb. 3, 2015, from corresponding International Application Serial No. PCT/US2014/060503.
Written Opinion of the International Searching Authority, dated Feb. 3, 2015, from corresponding International Application Serial No. PCT/US2014/060503.
PCT International Search Report, dated Feb. 3, 2015, from corresponding International Application Serial No. PCT/US2014/060482.
Written Opinion of the International Searching Authority, dated Feb. 3, 2015, from corresponding International Application Serial No. PCT/US2014/060482.
Office Action, dated Mar. 11, 2015, from corresponding U.S. Appl. No. 14/561,062.
PCT International Search Report, dated Feb. 17, 2015, from corresponding International Application Serial No. PCT/US2014/060525.
Written Opinion of the International Searching Authority, dated Feb. 17, 2015, from corresponding International Application Serial No. PCT/US2014/060525.
Office Action, dated Feb. 23, 2015, from corresponding U.S. Appl. No. 14/561,041.
PCT International Search Report, dated Feb. 4, 2015, from corresponding International Application Serial No. PCT/US2014/060517.
PCT International Preliminary Report on Patentability, dated Apr. 28, 2016, from corresponding International Application Serial No. PCT/US2014/060482.
PCT International Search Report, dated May 2, 2016, from corresponding International Application Serial No. PCT/US2015/0060757.
Written Opinion of the International Searching Authority, dated May 2, 2016, from corresponding International Application Serial No. PCT/US2015/0060757.
Office Action, dated Dec. 18, 2015, from corresponding U.S. Appl. No. 14/514,155.
Final Office Action dated Nov. 27, 2015, from corresponding U.S. Appl. No. 14/199,830.
Office Action, dated Jan. 14, 2016, from corresponding U.S. Appl. No. 14/200,328.
PCT International Search Report, dated Jan. 18, 2016, from corresponding International Application Serial No. PCT/US2014/023618.
Written Opinion of the International Searching Authority, dated Jan. 18, 2016, from corresponding International Application Serial No. PCT/US2014/023618.
PCT International Preliminary Report on Patentability, dated Jan. 19, 2016, from corresponding International Application Serial No. PCT/US2014/023597.
Final Office Action received for U.S. Appl. No. 14/514,000, dated Feb. 12, 2018, 43 pages.
Final Office Action received for U.S. Appl. No. 14/514,155, dated Oct. 20, 2016, 18 pages.
International Preliminary Report on Patentability received for PCT Patent Application No. PCT/US2014/060525, completed on Dec. 10, 2015, 12 pages.

(56) References Cited

OTHER PUBLICATIONS

Non-Final Office Action received for U.S. Appl. No. 14/514,155, dated Jun. 11, 2018, 23 pages.
Non-Final Office Action received for U.S. Appl. No. 14/561,041, dated Mar. 30, 2018, 57 pages.
Non-Final Office Action received for U.S. Appl. No. 14/935,257, dated Apr. 20, 2017, 16 pages.
Non-Final Office Action received for U.S. Appl. No. 14/200,681, dated Jul. 25, 2016, 17 pages.
Office Action received for European Patent Application No. 14714534.6, dated May 26, 2017, 5 pages.
Office Action received for Japanese Patent Application No. 2016-501276, dated Nov. 1, 2016, 8 pages (4 pages of English Translation and 4 pages of Official Copy).
Office Action received for Japanese Patent Application No. 2016-501287, dated Aug. 30, 2016, 8 pages (4 pages of English Translation and 4 pages of Official Copy).
Office Action received for Japanese Patent Application No. 2016-501288, dated Nov. 1, 2016, 7 pages (3 pages of English Translation and 4 pages of Official copy).
Search Report and Written Opinion received for Singapore Patent Application No. 11201507531R, dated Jun. 27, 2016, 11 pages.
Search Report and Written Opinion received for Singapore Patent Application No. 11201507549S, dated May 31, 2016, 11 pages.
Summons to Attend Oral Proceedings received for European Patent Application No. 14854011.5, dated Apr. 3, 2018, 13 pages.
Non-Final Office Action received for U.S. Appl. No. 14/942,757, dated Jul. 19, 2018, 25 pages.
Non-Final Office Action received for U.S. Appl. No. 14/514,155, dated Sep. 28, 2018, 29 pages.
Notice of Allowance received for Singapore Patent Application No. 11201507536Q, dated Jul. 27, 2017, 6 pages.
Notice of Allowance received for U.S. Appl. No. 14/200,432, dated Feb. 7, 2019, 22 pages.
Notice of Allowance received for U.S. Appl. No. 14/514,276, dated Oct. 3, 2018, 11 pages.
Office Action received for Canadian Patent Application No. 2,905,338, dated Oct. 2, 2018, 8 pages.
Final Office Action received for U.S. Appl. No. 14/942,757, dated Mar. 21, 2019, 26 pages.
Office Action received for Chinese Patent Application No. 201480067863.9, dated Dec. 24, 2018, 39 pages (15 pages of English Translation and 24 pages of Official Copy).
McNamara, Paul, "'Doorman' Kiosk Accepts Package Deliveries When You're Not Home", Network world, Available at: <https://www.networkworld.com/article/2348365/data-cented-doorman--kiosk-accepts-package-deliveries-when-you-re-not-home.html>, Aug. 8, 2007, 4 pages.
Notice of Allowance received for Singapore Patent Application No. 11201507531R, dated Jul. 19, 2018, 7 pages.
"Mobile Shipping Label", Available online at: <www.mobilesolutions.fedex.com/shipping-label.html>, Retrieved on Sep. 25, 2013, pp. 1-2.
Notice of Allowance received for U.S. Appl. No. 14/942,697, dated Apr. 24, 2019, 18 pages.
Final Office Action received for U.S. Appl. No. 14/514,155, dated Jun. 21, 2019, 28 pages.
Guler, N., "Containerization and Terminal Area Requirements", Istanbul Technical University, Maritime Faculty, Available online at <URL:https://hrcak.srce.hr/file/82785>, Jul. 2002, 20 pages.
Office Action received for Canadian Patent Application No. 2,905,763, dated Jun. 18, 2019, 7 pages.
Final Office Action received for U.S. Appl. No. 15/253,473, dated Jul. 25, 2019, 33 pages.
Non-Final Office Action received for U.S. Appl. No. 15/252,629, dated Jul. 23, 2019, 21 pages.
Non-Final Office Action received for U.S. Appl. No. 15/706,442, dated Jul. 29, 2019, 9 pages.

* cited by examiner

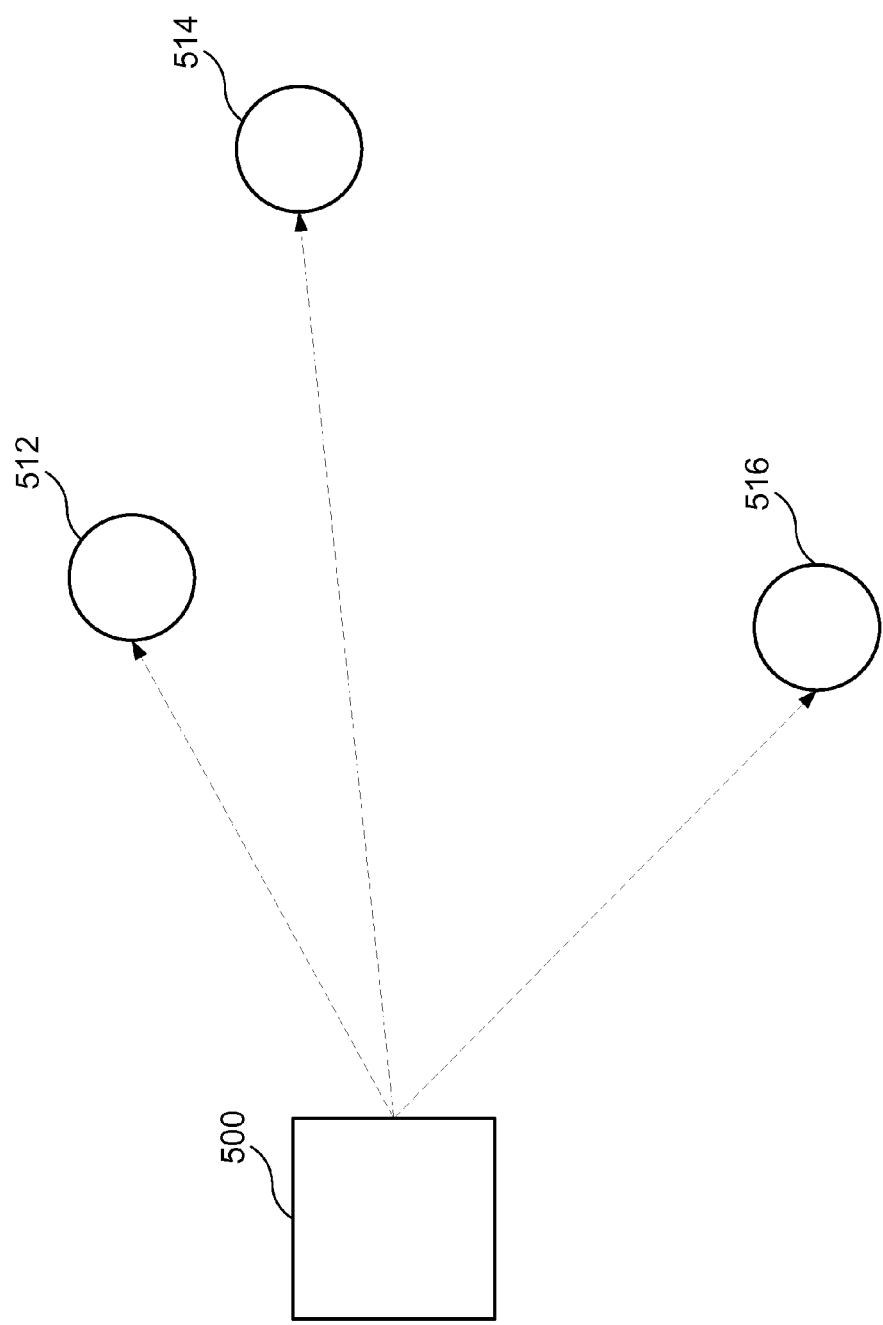

SYSTEMS AND METHODS FOR PARCEL DELIVERY TO ALTERNATE DELIVERY LOCATIONS

CROSS REFERENCE TO RELATED APPLICATION

This application claims the benefit of priority to U.S. Provisional Patent Application No. 61/759,800, filed Feb. 1, 2013, entitled, "Systems and Methods for Parcel Delivery to Alternate Delivery Locations," which is incorporated herein by reference in its entirety.

SUMMARY

A computer system, according to particular embodiments, comprises at least one processor. In various embodiments, the computer system is configured for: (A) receiving, from a delivery driver, an indication that delivery of one or more parcels is not possible at a primary delivery location; (B) at least partially in response to receiving the indication, retrieving alternate delivery location information associated with the primary delivery location; (C) determining, based at least in part on the alternate delivery location information, a suitable alternate delivery location; and (D) facilitating delivery of the one or more parcels from the primary delivery location to the suitable alternate delivery location. In particular embodiments, the alternate delivery location information comprises information selected from a group consisting of (i) one or more parcel recipient alternate delivery preferences; and (ii) one or more parcel shipper alternate delivery preferences.

A computer implemented method of directing parcels to alternate delivery locations, according to particular embodiments, comprises: (a) receiving, by a processor, an indication that delivery of a parcel is not possible at a primary delivery location; (b) retrieving, by a processor, alternate delivery location information associated with the primary delivery location; (c) determining, by a processor, based at least in part on the alternate delivery location information, an appropriate alternate delivery location; and (d) redirecting, by a processor, the parcel to the appropriate alternate delivery location.

A non-transitory computer-readable medium storing computer-executable instructions, according to various embodiments, stores computer-executable instructions for: (A) receiving, from a delivery driver, an indication that delivery of a parcel to a primary delivery location is not possible; (B) at least partially in response to receiving the indication, determining a suitable alternate delivery location for the parcel; (C) at least partially in response to determining the suitable alternate delivery location, facilitating delivery of the parcel to the suitable alternate delivery location; and (D) notifying an intended recipient of the parcel of the delivery of the parcel to the suitable alternate delivery location.

BRIEF DESCRIPTION OF THE DRAWINGS

Various embodiments of a system and method for delivering packages to alternate delivery locations are described below. In the course of this description, reference will be made to the accompanying drawings, which are not necessarily drawn to scale, and wherein:

FIGS. 4-5 are transportation diagrams depicting exemplary transportation paths taken by packages that are delivered to alternate delivery locations.

DETAILED DESCRIPTION OF VARIOUS EMBODIMENTS

Figure 1:
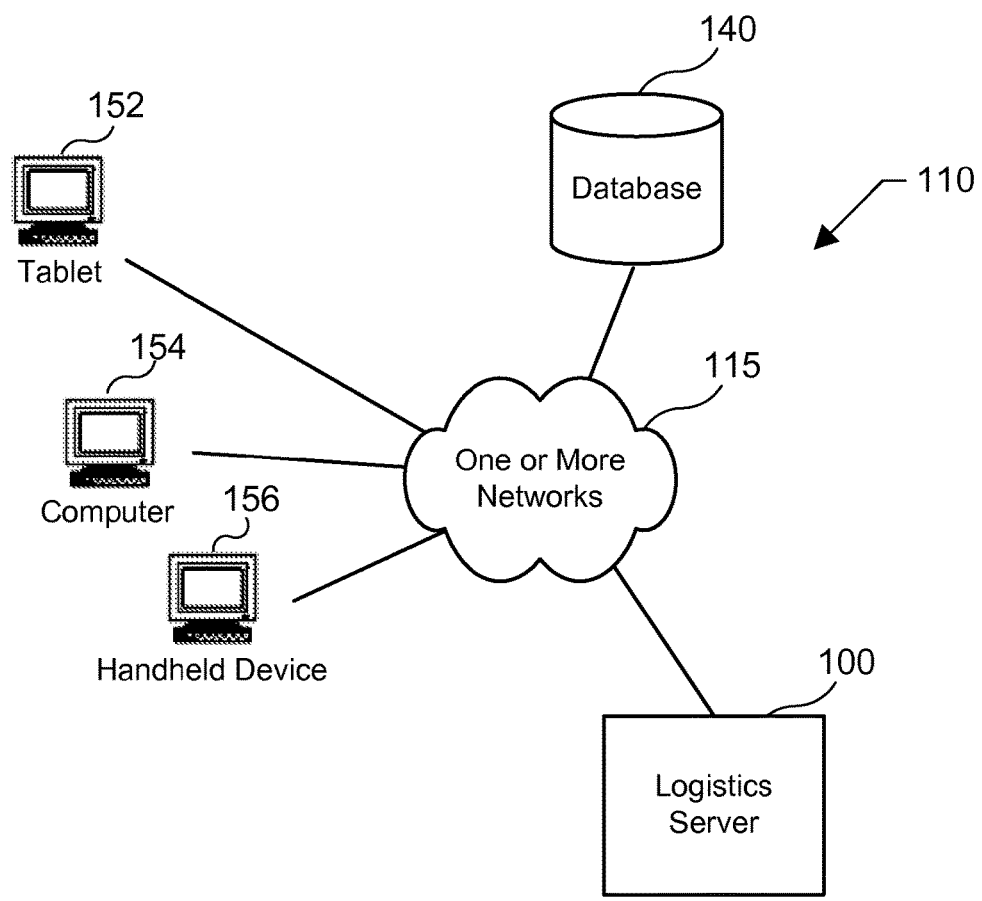
FIG. 1 is a block diagram of an alternate delivery location delivery system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, a system for delivering packages to alternate delivery locations is configured to facilitate the delivery of parcels to alternate delivery locations (e.g., via a common carrier, logistics company, etc.). In particular embodiments, an alternate delivery location may include a location other than the address of the parcel's intended recipient. In various embodiments, these alternate delivery locations include retail stores (e.g., including gas stations, grocery stores, and pharmacies), stand-alone kiosks, or any other suitable locations for receiving and holding parcels for pick up by recipients. For example, a parcel originally scheduled for delivery to a primary delivery location (e.g., such as the recipient's residence) may be redirected to an alternate delivery location. In particular embodiments, the redirection of the parcel to an alternate delivery location occurs at least partially in response to a determination that delivery of the parcel to the primary delivery location is not possible (e.g., because the recipient is not home when an attempt is made to deliver the parcel, the parcel requires a signature, the person delivering the parcel determines that it would be unsafe to leave the parcel outside of the primary delivery location, and/or for any other suitable reason). In other embodiments, the redirection of the parcel to an alternate delivery location occurs at least partially in response to a request from the parcel recipient to redirect the parcel. As a particular example, when the recipient is notified via a service such as the My Choice service offered by UPS of Atlanta, Ga. that the recipient has a parcel scheduled for delivery, the recipient may elect to have the parcel delivered to an alternate delivery location instead of the scheduled delivery address.

In other embodiments, the system is configured to facilitate the delivery of parcels directly to alternate delivery locations from a business or other entity from which the shipment of the parcel originated. Direct to alternate delivery location deliveries may include business-to-retail deliveries in which items ordered by a customer from a business (e.g., such as an e-commerce web site) are shipped directly to a retail location or other suitable alternate delivery location. For such deliveries, the items may be held at the alternate delivery location until picked up by the customer (e.g., the intended recipient). In such embodiments, the system may be configured to present customers with a selection of alternate delivery locations for items that the customer orders.

In various embodiments, the system is configured to confirm whether an alternate delivery location has capacity to accept a parcel before directing (e.g., or redirecting) a parcel to the alternate delivery location. This may include, for example, ensuring that there is enough physical space at the alternate delivery location to accept the parcel or suitable systems in place at the alternate delivery location to accommodate any special handling instructions that the parcel may have (e.g., a requirement to store the parcel at a particular temperature). In such embodiments, the system may be further configured to substantially automatically (e.g., automatically) reserve space at the alternate delivery location for the parcel to ensure that the alternate delivery location will not lose capacity to accept the parcel before the parcel arrives.

In particular embodiments, shipping items directly to alternate delivery locations provides a cost savings to common carriers and other shipping and/or logistics companies by avoiding the need to deliver parcels and other items to the home addresses of individual parcel recipients. Rather, the common carriers can deliver parcels to several alternate delivery locations that service a particular area where parcel recipients can go to collect their parcels.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes one or more computer networks 115, a Logistics Server 100, a Database 140, and one or more remote computing devices such as a tablet computer 152, a desktop or laptop computer 154, or a handheld computing device 156, such as a cellular phone. In particular embodiments, the one or more computer networks facilitate communication between the Logistics Server 100, Database 140, and one or more remote computing devices 152, 154, 156.

One or more computer networks 115 may include any of a variety of types of wired or wireless computer networks such as the Internet, a private intranet, a public switch telephone network (PSTN), or any other type of network. The communication link between Logistics Server 100 and Database 140 may be, for example, implemented via a Local Area Network (LAN) or via the Internet.

Figure 2:
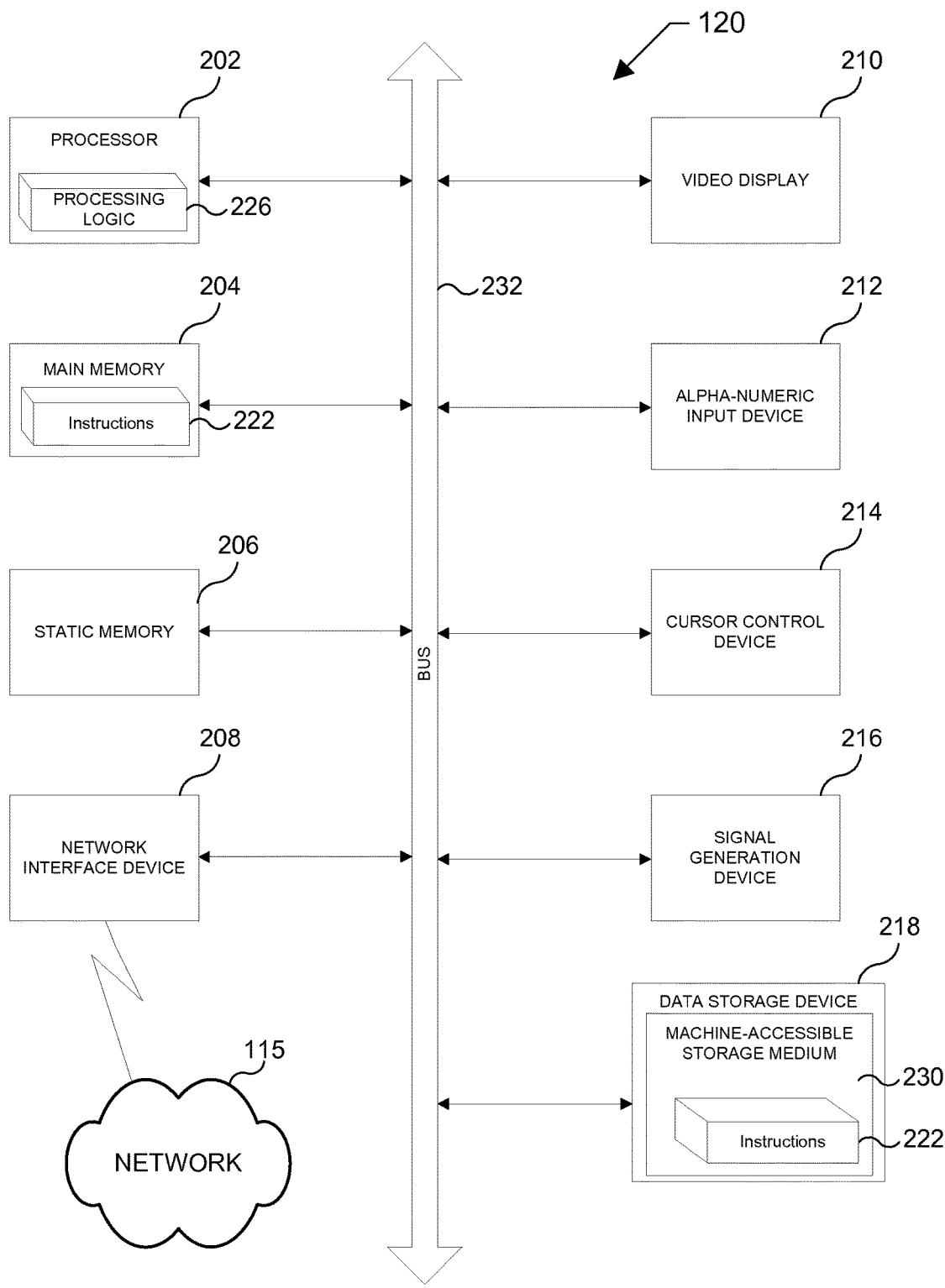
FIG. 2 is a schematic diagram of a computer, such as the logistics server of FIG. 1, that is suitable for use in various embodiments.

FIG. 2 illustrates a diagrammatic representation of a computer architecture 120 that can be used within the System 110, for example, as a client computer (e.g., one of the client computers 152, 154, 156 shown in FIG. 1), or as a server computer (e.g., Logistics Server 100 shown in FIG. 1). In particular embodiments, the computer 120 may be suitable for use as a computer within the context of the System 110 that is configured to facilitate the delivery of parcels to alternate delivery locations or facilitate the receipt and/or processing of parcels once they are delivered to the alternate delivery locations.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The Computer 120 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within main memory 204 and/or within processing device 202 during execution thereof by computer 120—main memory 204 and processing device 202 also constituting computer-accessible storage media. The software 222 may further be transmitted or received over a network 220 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a system for delivering parcels to alternate delivery locations may be implemented within the context of any suitable service. For example, particular embodiments may be implemented within the context of any service offered by UPS of Atlanta, Ga. Various aspects of the system's functionality may be executed by certain system modules, including a Parcel Redirection Module 300. This module is discussed in greater detail below.

Parcel Redirection Module

Figure 3:
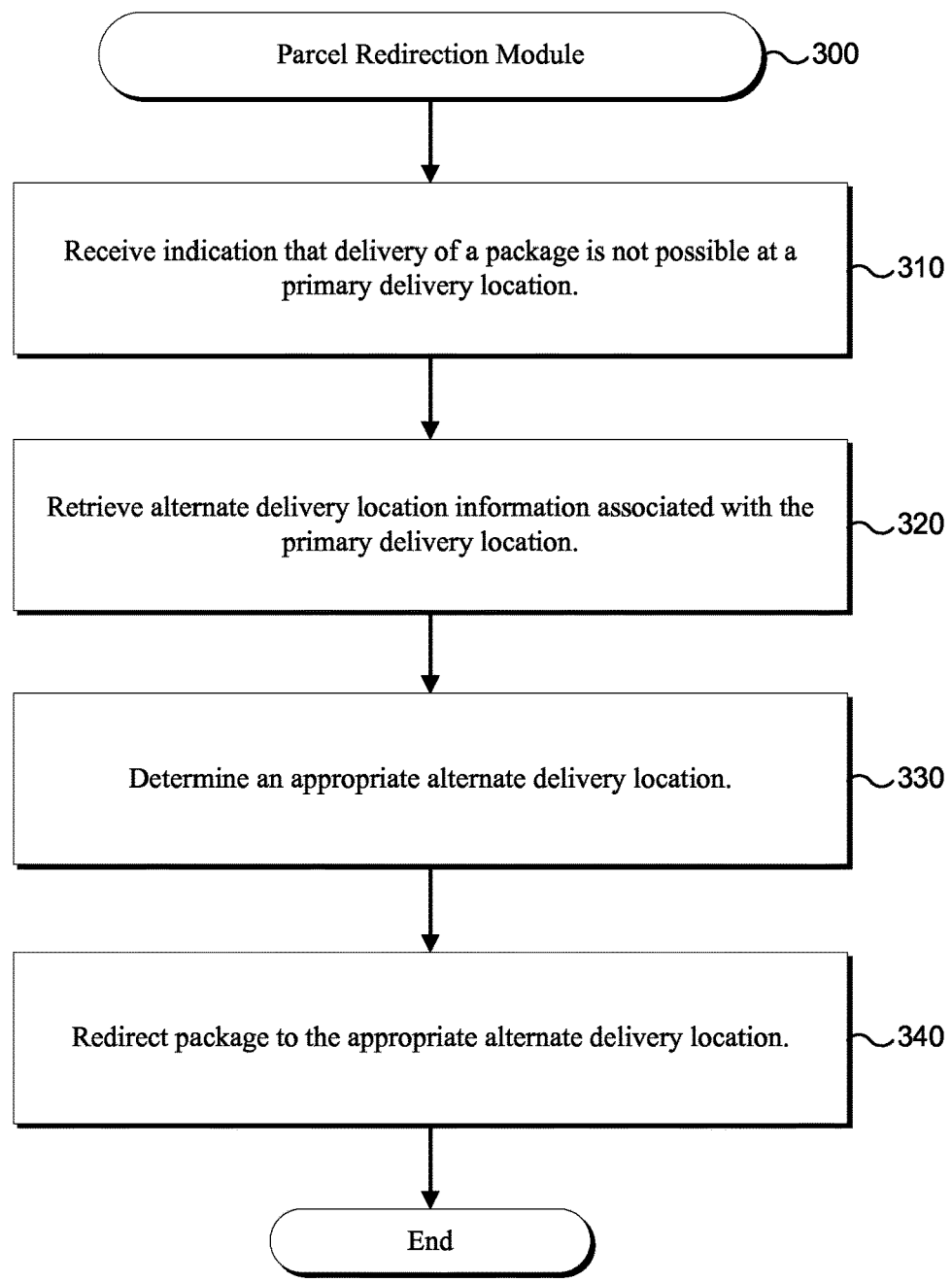
FIG. 3 depicts a flow chart that generally illustrates various steps executed by an parcel redirection module that, for example, may be executed by the logistics server of FIG. 1.

FIG. 3 is a flow chart of operations performed by an exemplary Parcel Redirection Module 300. In particular embodiments, the Parcel Redirection Module 300 may facilitate the redirection of parcels from a primary delivery location (e.g., such as the parcel recipient's residence or other address to which the parcel is addressed) to an alternate delivery location.

When executing the Parcel Redirection Module 300, the system begins, at Step 310, by receiving an indication that delivery of one or more parcels is not possible at a primary delivery location. In various embodiments, the system receives the indication that the one or more parcels are undeliverable from a delivery driver who was unable to perform the delivery. In particular embodiments, the system is configured to receive the indication in any suitable manner (e.g., via input on a wireless device such as a smart phone or DIAD). A delivery of a parcel may not be possible, for example, because the parcel recipient is not home to receive the parcel, because no one is present at the primary delivery location to sign for the parcel if the parcel requires signature confirmation, or for any other suitable reason.

The system continues, at Step 320, by retrieving alternate delivery location information for the one or more parcels. In various embodiments, alternate delivery location information includes the following: (1) alternate delivery location availability information; (2) parcel recipient alternate delivery location preferences; and (3) parcel shipper alternate delivery location preferences. Each of these is described below.

Alternate Delivery Location Availability Information

In particular embodiments, the alternate delivery location information retrieved by the system includes the locations of one or more alternate delivery locations as well as information relating to the ability of those one or more alternate delivery locations to receive parcels. In various embodiments, the system is configured to retrieve location information for one or more alternate delivery locations that are within a particular distance of the primary delivery location to which delivery of the one or more parcels was not possible. In particular embodiments, the particular distance from the primary delivery location for which the system retrieves alternate delivery location information depends at least in part on the primary delivery location (e.g., whether the primary delivery location is in an urban or rural setting, is a business or residential address, etc.).

As a particular example, when a primary delivery location is in an urban or more densely populated area, the system may be configured to retrieve information for one or more alternate delivery locations that are no more than a short distance from the primary delivery location (e.g., within walking distance of the primary delivery location, within 1 mile of the primary delivery location, within a particular number of stops on a public transportation system from the primary delivery location, etc.). In a different example, when a primary delivery location is in a rural area, the system may be configured to retrieve information for one or more alternate delivery locations that are farther from the primary delivery location (e.g., up to ten miles from the primary delivery location, within a fifteen minute drive of the primary delivery location, etc.). In various embodiments, the system may be configured to retrieve information associated with one or more alternate delivery locations that are within a particular travel time of the primary delivery location (e.g., via car, on foot, via public transportation, etc.).

In various embodiments, the system is configured to determine alternate delivery location information based at least in part on a location of a delivery driver, which may, for example, be determined based on a location of a mobile device (e.g., such as a smart phone or DIAD), or other GPS device, associated with the delivery driver (e.g., based on GPS co-ordinates of the mobile device, etc.). In such embodiments, the system may be configured to locate one or more alternate delivery locations that are no more than a particular distance from the delivery driver as discussed above. In other embodiments, the system may be configured to locate one or more alternate delivery locations that are no more than a particular distance from a delivery route of the delivery driver (e.g., one or more alternate delivery locations to which the delivery driver could deliver the one or more parcels without substantially deviating from their delivery route).

In particular embodiments, the one or more alternate delivery locations may include, for example, one or more retail stores (e.g., including gas stations, grocery stores, and pharmacies), stand-alone kiosks, or any other suitable location for receiving and holding parcels for pick up by recipients. In various embodiments, the one or more alternate delivery locations may have limited capacity for receiving and holding parcels (e.g., redirected parcels) until the parcels are picked up by the intended recipients. For example, an alternate delivery location that is part of a grocery store may have limited physical storage space (e.g., shelf space) for storing parcels. Other alternate delivery locations may be unable to store particular parcels that require special handling (e.g., refrigeration or other temperature storing requirements). In various embodiments, the alternate delivery location information includes information relating to the ability of a particular alternate delivery location to receive and store a parcel. In particular embodiments, the system may substantially continuously (e.g., continuously) update capacity information for a particular alternate delivery location. In other embodiments, the system may update capacity information for a particular alternate delivery location other than substantially continuously (e.g., once per day, two times per day, hourly, etc.).

Parcel Recipient Alternate Delivery Location Preferences

In particular embodiments, the system is configured to retrieve alternate delivery location information that includes one or more parcel recipient preferences related to one or more alternate delivery locations. These one or more parcel recipient preferences may be provided to the system by parcel recipients, for example, and may include preferences related to particular alternate delivery locations to which recipients would like their parcels redirected following unsuccessful deliveries. In particular embodiments, the system is configured to allow parcel recipients to provide a list of preferred alternate delivery locations that are ranked from most preferred to least preferred. In various embodiments, the system is configured to redirect parcels to the parcel recipient's most preferred alternate delivery location that is able to accept the parcel. A parcel recipient may, for example, provide a most preferred alternate delivery location that is situated between the recipient's home and place of work, so that the recipient can pick up the parcel from the alternate delivery location on the way home from work. In various embodiments, a parcel recipient's most preferred alternate delivery location may be unavailable to accept delivery of a particular parcel. In such cases, the system may be configured to redirect the parcel to the parcel recipient's second most preferred alternate delivery location (and so on).

In various embodiments, the system is configured to allow a parcel recipient to provide preferred alternate delivery locations for any parcel that the recipient may receive (e.g., for all parcels scheduled for shipment to the parcel recipient, regardless of the source of the parcel). In other embodiments, the system is configured to allow a parcel recipient to select or provide one or more preferred alternate delivery locations for specific parcels (e.g., in response to the parcel recipient receiving a notification that the parcel recipient is currently scheduled to receive a particular parcel). In particular embodiments, following an unsuccessful delivery attempt, the system may be configured to notify the parcel recipient that the carrier was unable to deliver the parcel to the primary delivery location and is further configured to provide the parcel recipient with a selection of alternate delivery locations to which the parcel can be directed. In various embodiments, the system is configured to only provide selected alternate delivery locations from which the parcel recipient may choose that have substantially current (e.g., current) availability to accept the parcel.

In various embodiments, following an unsuccessful delivery attempt, the system may be configured to provide the parcel recipient with a selection of available alternate delivery locations and a time period during which the parcel recipient may select an alternate delivery location from the selection of alternate delivery locations. In response to receiving the selection from the parcel recipient, the system may be configured to redirect the parcel to the selected alternate delivery location. If the system does not receive a selection from the parcel recipient during the time period, the system may be configured to substantially automatically determine a suitable alternate delivery location and redirect the parcel to that location.

Parcel Shipper Alternate Delivery Location Preferences

In various embodiments, the system is configured to allow a shipper to select whether parcels that the shipper sends to recipients can be redirected to alternate delivery locations following unsuccessful delivery attempts. For example, when sending a parcel, the shipper may indicate that the parcel should not be rerouted to an alternate delivery location in the event of an unsuccessful delivery attempt. In particular embodiments, shippers may opt out of allowing parcels that the shipper sends to be rerouted to alternate delivery locations for any suitable reason (e.g., because of the nature of the item being shipped, etc.).

Returning to FIG. 3, the system continues, at Step 330, by determining an appropriate alternate delivery location based at least in part on the alternate delivery location information retrieved at Step 320. The system may, for example, determine that the appropriate alternate delivery location is the alternate delivery location that is highest on the parcel recipient's list of preferred alternate delivery locations that has sufficient capacity to receive the parcel in terms of space and special handling requirements. As another example, the system may determine that no alternate delivery location is suitable to receive a parcel (e.g., because the shipper indicated a preference for the parcel not to be redirected to an alternate delivery location). In this example, the parcel may be returned to a local distribution center instead of an alternate delivery location and delivery may be attempted on the following day or at any other suitable time.

In particular embodiments, the system is configured to determine an appropriate alternate delivery location based at least in part on a size and/or weight of the parcel. For example, parcels of a particular size may be too large to leave at the primary delivery location when no one is available to accept the delivery of the parcel (e.g., because the size of the parcel may render the parcel more susceptible to theft if left outside of the primary delivery location). As a different example, parcels that are particularly large in size and/or weight may be unsuitable for redirection to an alternate delivery location due to the difficulty that a parcel recipient may face in transporting a parcel picked up at an alternate delivery location to the parcel recipient's residence. For example, parcels of a certain size or weight may be difficult for a parcel recipient to fit in the parcel recipient's vehicle or may be too heavy for the parcel recipient to carry. For such parcels, the system may be configured to direct a common carrier delivery driver to release the parcel at the primary delivery address (e.g., by leaving the parcel at the primary delivery address) rather than redirecting the parcel to an alternate delivery location.

Returning to FIG. 3, the system continues, at Step 340, by directing the parcel to the appropriate alternate delivery location determined at Step 330. In particular embodiments, directing the parcel to the appropriate delivery location comprises substantially automatically (e.g., automatically) reserving space at that alternate delivery location for the parcel (e.g., to ensure that there will be room and/or capacity for the parcel once the parcel arrives at the alternate delivery location). In various embodiments, directing the parcel to the appropriate alternate delivery location further comprises confirming that the parcel has been deposited at a particular alternate delivery location. In various embodiments, confirming that the parcel has been deposited at the alternate delivery location may include receiving a scan of an indicia associated with and located at the alternate delivery location from a delivery driver when the delivery driver deposits the parcel at the alternate delivery location. For example, when depositing a parcel at an alternate delivery location, the driver may scan the parcel and then scan an indicia (e.g., such as a bar code, QR code, or other suitable indicia) that is physically located at the alternate delivery location (e.g., on a wall, counter, etc.). At least partially in response to receiving a scan of a parcel followed by a scan of an indicia of a particular alternate delivery location, the system, in various embodiments, is configured to associate the parcel with that alternate delivery location (e.g., for the purposes of tracking the parcel, notifying the intended parcel recipient of the location of the parcel, etc.). In other embodiments, the system is configured to confirm delivery of a parcel at an alternate delivery location using any other suitable technique (e.g., GPS tracking, geocoding, etc.). In particular embodiments, the system is configured to notify the parcel recipient that parcel has been delivered to the alternate delivery location (e.g., via e-mail, SMS, text message, or any other suitable method of communication).

Alternate Embodiments

Direct to Alternate Delivery Location Shipments

In various embodiments, businesses provide customers with the option of having items scheduled for shipment to those customers (e.g., purchased by those customers) shipped directly to alternate delivery locations, rather than having the items shipped to the customer's home or office. In such embodiments, the businesses may provide a selection of alternate delivery locations to which the customer may send shipments. In other embodiments, the alternate delivery locations may be supplied by the common carrier that coordinates the shipment of the item. For example, a common carrier such as UPS may have particular alternate delivery locations associated with the common carrier in a particular city (e.g., such as Atlanta, Ga.). A customer ordering an item for shipment to that particular city may, when ordering the item, be presented with a listing of the particular alternate delivery locations associated with the common carrier. In particular embodiments, the system is configured to substantially automatically (e.g., automatically) reserve space at an alternate delivery location for an item ordered by a customer at least partially in response to the customer selecting that alternate delivery location as the shipping destination of the item the customer is to receive.

Packaging for Business-to-Retail Parcels

In particular embodiments, an alternate delivery location that accepts parcels shipped directly to the alternate delivery location may also receive parcels intended for the alternate delivery location itself. For example, a grocery store that acts as an alternate delivery location may receive parcels that are shipped to and intended for the grocery store in addition to parcels that are shipped to the grocery store but intended for storage at the alternate delivery location associated with the grocery store until the parcel can be picked up by a parcel recipient. In such instances, parcels that are direct to alternate delivery location parcels intended for a person other than the alternate delivery location itself may contain an indicia indicating that the parcel is to be picked up by the parcel recipient rather than opened by someone at the alternate delivery location. In such embodiments, the indicia can allow alternate delivery locations to differentiate between parcels intended for the alternate delivery location from parcels that have been shipped to or redirected to the alternate delivery location but are to be picked up by a different parcel recipient.

In various embodiments, the indicia may include a particular marking on parcels intended for pick up by parcel recipients (e.g., a particular color marking, sticker, label, etc.). In particular embodiments, the indicia are machine-readable indicia that are readable to update tracking information associated with the parcel (e.g., updating information to notify the parcel recipient that the parcel is 'ready for pick up').

Non-Guaranteed Deliveries

In particular embodiments, the system is configured to provide customers with a non-guaranteed shipping option (e.g., a shipping option that does not guarantee shipment within a particular number of days). The system may be configured to make periodic shipments from any particular business to a particular alternate delivery location. For example, a common carrier may provide a non-guaranteed shipping option for items shipped from a particular online electronics retailer to a particular alternate delivery location, and the common carrier may then only make shipments from the particular online electronics retailer to the particular alternate delivery location once per week (e.g., or once every other week, etc.). In various embodiments, a common carrier may charge less for a non-guaranteed shipping option than for other shipping options (e.g., such as two day shipping, overnight, etc.).

In other embodiments, the system is configured to release shipments placed with non-guaranteed shipping options from a particular retailer to a particular alternate delivery location only when a particular number of orders have been placed from that particular retailer for shipment to that particular alternate delivery location. For example, the system may be configured to only send a shipment of items or parcels from that particular retailer to that particular alternate delivery location once a sufficient number of orders have been placed with non-guaranteed shipping from that particular retailer to that particular alternate delivery location to substantially fill (e.g., completely fill) an entire delivery truck.

In still other embodiments, the system may be configured to hold any parcels scheduled for delivery to a particular parcel recipient until a predetermined number of parcels have been scheduled for shipment to the particular parcel recipient. For example, a logistic company's regional distribution center may contain a bin for the particular parcel recipient in which all parcels for that particular recipient are placed. The parcels would then be delivered once the bin had filled up in order to decrease the number of trips needed to deliver all of the parcels to the particular parcel recipient (e.g., to the recipients residence or an alternate delivery location selected by the recipient).

Illustrative Examples

Figure 4:
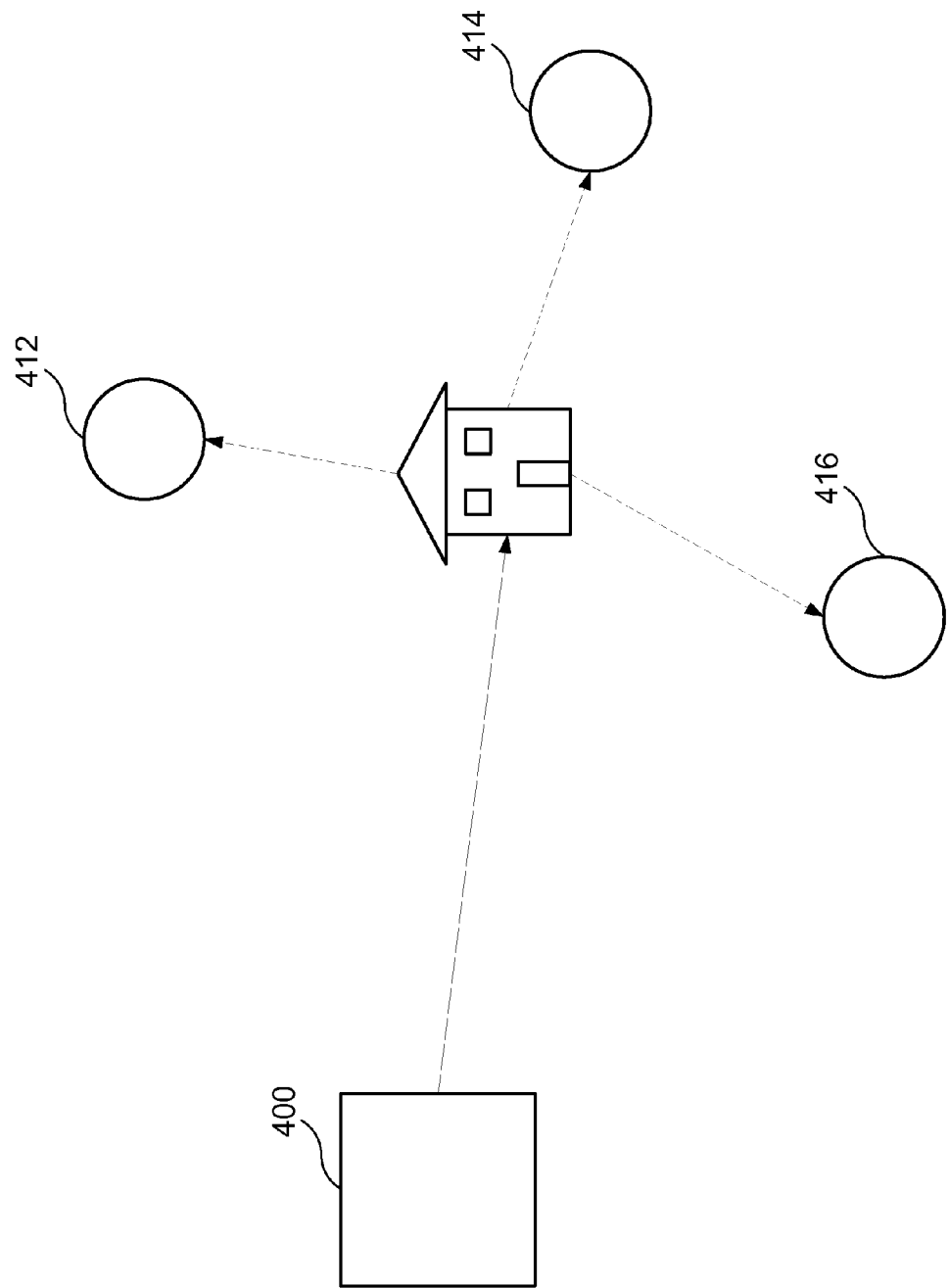

FIG. 4 shows an exemplary transportation diagram that generally illustrates the redirection of a delivery from a primary delivery location to an alternate delivery location. As shown in this figure, a parcel 400 may be delivered from any suitable starting point (e.g., such as a local distribution center, retailer, warehouse, etc.) to a primary delivery location 404 (e.g., such as a residence, office, etc.). If it is not possible to deliver the parcel 400 to the primary delivery location 404, the system will redirect the parcel to an alternate delivery location 412, 414, 416. The alternate delivery locations may include, for example, gas stations, grocery stores, pharmacies, stand-alone kiosks, or any other suitable location for receiving and holding parcels for pick up by recipients.

In various embodiments, a system for directing parcels to alternate delivery locations will determine the most suitable alternate delivery location to which the parcel should be delivered. In the example shown in FIG. 4, the parcel recipient may have provided the parcel carrier (e.g., the company responsible for delivering the parcel to the recipient) with an ordered list of preferred alternate delivery locations, such as a preference for alternate delivery locations A, B, and C in that order. The system, when determining the most suitable alternate delivery location for the undeliverable parcel, may determine which alternate delivery location is most preferable to the parcel recipient that also has availability to receive and hold the parcel until the recipient can pick the parcel up from the alternate delivery location. If, for example, alternate delivery location A 412 is completely full and cannot accept any more parcels, but alternate delivery location B 414 has space to receive the parcel 400, the system would determine that alternate delivery location B 414 is the most suitable alternate delivery location. The system may then redirect the parcel to alternate delivery location B 414. In various embodiments, the system is configured to substantially automatically reserve space for the parcel 400 at the alternate delivery location determined to be most suitable (e.g., in this case, the system would reserve space for the parcel at alternate delivery location B 414). In such embodiments, reserving space may avoid a problem where an alternate delivery location was determined to have availability, but when the parcel finally reached the alternate delivery location, there was no longer availability.

FIG. 5 depicts an exemplary transportation diagram that generally illustrates the delivery of a parcel 500 directly from a retailer to an alternate delivery location 512, 514, 516. As may be understood from this figure, parcel recipients may elect to have parcels delivered directly to alternate delivery locations 512, 514, 516. In various embodiments, logistics companies or common carriers may limit the frequency with which they make deliveries to a particular alternate delivery location or for a particular parcel recipient. In such embodiments, the logistics company or common carrier may make no guarantee as to how much time it will take to ship the parcel to its ultimate destination as discussed above.

CONCLUSION

Many modifications and other embodiments of the invention will come to mind to one skilled in the art to which this invention pertains having the benefit of the teachings presented in the foregoing descriptions and the associated drawings. While examples discussed above cover the use of the invention in the context a document management service, the invention may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A method for redirecting undeliverable parcels to an alternate delivery location utilizing a logistics server, a server associated with one or more potential alternate delivery locations, a database, a wireless computing device, a delivery vehicle, a scanning device, and at least one processor, the method comprising:

receiving, at said logistics server, from said wireless computing device, an indication that delivery of one or more parcels is not possible at a primary delivery location during a first delivery attempt of said one or more parcels to said primary delivery location;

based on receiving the indication, determining, via a processor at the logistics sever, that the one or more parcels are suitable for redirection to an alternate delivery location based on a predetermined weight and a predetermined size, wherein the one or more parcels are prevented from redirection if a weight and size of the one or more parcels exceed the predetermined weight and the predetermined size;

at least partially in response to determining the one or more parcels are suitable for redirection, retrieving, via the processor from said database, preferred alternate delivery location information associated with said primary delivery location, said preferred alternate delivery location information comprising information selected from a group consisting of:

i. one or more parcel recipient alternate delivery preferences; and ii. one or more parcel shipper alternate delivery preferences;

at least partially in response to determining the one or more parcels is suitable for redirection, identifying, via the processor, one or more proximate alternate delivery locations that are within a threshold distance of delivery route of said delivery vehicle;

determining, via the processor of the logistics server, the one or more potential alternate delivery locations based at least in part on said preferred alternate delivery location information and said one or more proximate alternate delivery locations;

after determining the one or more potential alternate delivery locations, requesting, from the server associated with each of the one or more potential alternate delivery locations, availability information for said one or more potential alternate delivery locations, the availability information comprising available physical space;

determining, via the processor at the logistics server, a suitable alternate delivery location based at least in part on said one or more potential alternate delivery locations and said availability information, wherein determining said suitable alternate delivery location based on said availability information comprises ensuring there is enough physical space at said suitable alternate delivery location to accept said one or more parcels; and based on said determining the suitable alternate delivery location, delivering, via the delivery vehicle, the one or more parcels to said suitable alternate delivery location, wherein delivery of said one or more parcels comprises:

delaying a delivery of the one or more parcels while the one or more parcels are located at a distribution center along a shipment route;

determining, via the processor, whether a predetermined number of parcels have been scheduled for delivery to the suitable alternate delivery location;

based on determining the predetermined number of parcels have been scheduled for delivery, delivering said one or more parcels and the predetermined number of parcels to said suitable alternate delivery location via the delivery vehicle;

confirming delivery of said one or more parcels at said suitable alternate delivery location by scanning, via the scanning device, of an indicia associated with at least one of the one or more parcels and the suitable alternate delivery location; and notifying a parcel recipient that said one or more parcels have been delivered to said suitable alternate delivery location.

2. The method of claim 1, wherein:
said at least one processor is further configured for receiving, from an intended recipient of said one or more parcels, said one or more parcel recipient alternate delivery preferences; and
said preferred alternate delivery location information comprises said one or more parcel recipient alternate delivery preferences.

3. The method of claim 2, wherein:
said one or more parcel recipient alternate delivery preferences comprise:
a first preferred alternate delivery location and;
a second preferred alternate delivery location.

4. The method of claim 3, wherein:
determining said suitable alternate delivery location comprises determining an availability of said first preferred alternate delivery location to accept delivery of said one or more parcels; and
said at least one processor is further configured for:
at least partially in response to determining that said first preferred alternate delivery location has said availability, facilitating delivery of said one or more parcels to said first preferred alternate delivery location; and
notifying said intended recipient of said delivery of said one or more parcels to said first preferred alternate delivery location.

5. The method of claim 4, wherein said at least one processor is further configured for:
at least partially in response to determining that said first preferred alternate delivery location does not have said availability to accept delivery of said one or more parcels, determining whether said second preferred alternate delivery location has availability to accept delivery of said one or more parcels;
at least partially in response to determining that said second preferred alternate delivery location has said availability to accept delivery of said one or more parcels, facilitating delivery of said one or more parcels to said second preferred alternate delivery location; and
notifying said intended recipient of said delivery of said one or more parcels to said second preferred alternate delivery location.

6. The method of claim 5, wherein said at least one processor is further configured for:
at least partially in response to determining that said second preferred alternate delivery location does not have said availability to accept delivery of said one or more parcels, automatically determining said suitable alternate delivery location, said suitable alternate delivery location being a location other than said first preferred alternate delivery location or said second preferred alternate delivery location.

7. The method of claim 1, wherein:
said preferred alternate delivery location information comprises said one or more parcel shipper alternate delivery preferences;
said one or more parcel shipper alternate delivery preferences comprise a preference to not deliver said one or more parcels to a particular alternate delivery location;
facilitating said delivery of the one or more parcels from said primary delivery location to said suitable alternate delivery location comprises facilitating delivery of said one or more parcels to a temporary holding location; and
said at least one processor is further configured for facilitating delivery of said one or more parcels from said temporary holding location to said primary delivery location.

8. A method of directing parcels to alternate delivery locations, comprising:
receiving at a logistics server from a mobile computing device an indication that delivery of a parcel is not possible at a primary delivery location following a first delivery attempt of said parcel to said primary delivery location of a parcel recipient;
based on receiving the indication, determining, via a processor, that the parcel is suitable for redirection based on a predetermined size and a predetermined weight, wherein the parcel is prevented from redirection if a weight and a size of the parcel exceeds the predetermined weight and the predetermined size;
determining, by the processor, a current location of a delivery driver by determining a location of said mobile computing device;
based on determining the parcel is suitable for redirection, receiving alternate delivery location information associated with said primary delivery location, said alternate delivery location information comprising one or more potential alternate delivery locations within a particular distance of (i) said primary delivery location; (ii) the current location of said delivery driver; and (iii) a delivery route of said delivery driver, such that said one or more of potential alternate delivery locations comprise one or more alternate delivery locations to which said delivery driver could deliver said parcel;
based on receiving the indication, determining, by the processor, based at least in part on said alternate delivery location information, an appropriate alternate delivery location;
after determining the appropriate alternate delivery location, requesting, from a server associated with the appropriate alternate delivery location, availability information for the appropriate alternate delivery location, the availability information comprising available physical space; and delivering the parcel to the appropriate alternate delivery location through the use of a delivery vehicle comprising:
  delaying a delivery of the parcel while the parcel is located at a distribution center along a shipment route;
  determining whether a predetermined number of parcels have been scheduled for delivery to the appropriate alternate delivery location; and
  based on the predetermined number of parcels being satisfied, modifying the delivery route of the delivery vehicle to include delivery of the parcel and the predetermined number of parcels to the appropriate alternate delivery location.

9. The computer implemented method of claim 8, wherein said alternate delivery location information comprises locations of one or more potential alternate delivery locations within the particular distance of said primary delivery location.

10. The computer implemented method of claim 8, wherein said alternate delivery location information comprises a capacity of alternate delivery locations to accept redirected parcels.

11. The computer implemented method of claim 8, wherein said alternate delivery location information comprises alternate delivery location preferences of the parcel recipient.

12. The computer implemented method of claim 8, wherein said alternate delivery location information comprises alternate delivery location preferences of a shipper of said parcel.

13. The computer implemented method of claim 8, further comprising automatically reserving space at said appropriate alternate delivery location, by the processor, for said parcel.

14. The computer implemented method of claim 8, wherein said determining said appropriate alternate delivery location is further based at least in part on the size of said parcel, the weight of said parcel, or the size and the weight of said parcel.

15. The method of claim 8, further comprising restricting one or more potential alternate delivery locations for delivering the parcel based on a population density of an area associated with said primary delivery location.

16. A non-transitory computer-readable medium storing computer executable instructions for:
  receiving, at a logistics server, via a mobile computing device, an indication of an attempted delivery where the delivery of a parcel to a primary delivery location is not possible where the said step of receiving is executed after a delivery driver is unable to perform said delivery of said parcel to said primary delivery location of an intended recipient;
  at least partially in response to receiving said indication;
  determining that the parcel is suitable for redirection to an alternate delivery location based on a predetermined size and a predetermined weight, wherein the parcel is prevented from redirection if a weight and a size of the one or more parcels exceed the predetermined weight and the predetermined size;
  determining a current location of said delivery driver by determining a location of said mobile computing device;
  determining a plurality of potential alternate delivery locations for said parcel, said plurality of potential alternate delivery locations comprising a plurality of potential alternate delivery locations that are each within a particular distance of (i) said current location of said delivery driver; and (ii) a delivery route of said delivery driver;
  at least partially in response to determining said plurality of potential alternate delivery locations:
  notifying the intended recipient that said delivery was not possible at said primary delivery location;
  providing said intended recipient with a listing of said plurality of potential alternate delivery locations and a designated time period during which said intended recipient may select a particular one of said plurality of potential alternate delivery locations in order to have said parcel delivered to the particular one of said plurality of potential alternate delivery locations;
  enabling said intended recipient to select said particular one of said plurality of potential alternate delivery locations during said designated time period;
  determining whether said intended recipient has selected said particular one of said plurality of potential alternate delivery locations during said designated time period;
  at least partially in response to determining that said intended recipient has selected said particular one of said plurality of potential alternate delivery locations during said designated time period, facilitating delivery of said parcel to said particular one of said plurality of potential alternate delivery locations;
  at least partially in response to determining that said intended recipient has not selected said particular one of said plurality of potential alternate delivery locations during said designated time period: (i) determining which of said plurality of potential alternate delivery locations are most proximate to the delivery route of said delivery driver and (ii) selecting a suitable alternate delivery location from said plurality of potential alternate delivery locations that are most proximate to said delivery route;
  initiating a delivery of said parcel to said suitable alternate delivery location through the use of a delivery vehicle, wherein initiating the delivery of the parcel comprises:
  delaying a delivery of the parcel while the parcel is located at a distribution center along a shipment route;
  determining whether a predetermined number of parcels have been scheduled for delivery to the suitable alternate delivery location;
  based on the predetermined number of parcels being satisfied, rerouting the delivery route of the delivery vehicle to deliver the parcel and the predetermined number of parcels to the suitable alternate delivery location.

17. The non-transitory computer-readable medium of claim 16, wherein:
  said non-transitory computer-readable medium further stores computer-executable instructions for:
  at least partially in response to receiving said indication that said delivery of said parcel is not available, providing a selection of one or more alternate delivery locations to said intended recipient;
  receiving a selection of said one or more alternate delivery locations from said intended recipient; and
  at least partially in response to receiving said selection, facilitating delivery of said parcel to said selected alternate delivery location.

18. The non-transitory computer-readable medium of claim 16, wherein determining said suitable alternate delivery location comprises determining said suitable alternate delivery location based at least in part on a population density of an area associated with said primary delivery location.

19. The non-transitory computer-readable medium of claim 16, wherein determining said suitable alternate delivery location comprises determining said suitable alternate delivery location based at least in part on one or more delivery preferences associated with a shipper of said parcel.

20. The non-transitory computer-readable medium of claim 16, further wherein facilitating delivery of said parcel to said suitable alternate delivery location comprises confirming that said parcel has been delivered to said suitable alternate delivery location by:
- receiving a scan of an indicia physically associated with and located at said suitable alternate delivery location from said delivery driver via said mobile computing device when said delivery driver deposits said parcel at said suitable alternate delivery location; and
- updating tracking information for said parcel to associate said parcel with said suitable alternate delivery location.

\* \* \* \* \*